United States Patent Office 2,835,653
Patented May 20, 1958

2,835,653
POLYOXYETHYLENE SUBSTITUTED POLYMERS AND THEIR PREPARATION

Howard C. Haas, Arlington, and Saul G. Cohen, Lexington, Mass., assignors to Polaroid Corporation, Cambridge, Mass., a corporation of Delaware No Drawing. Application March 19, 1953
Serial No. 343,513

7 Claims. (Cl. 260—72)

The present invention relates to compositions of matter and their preparation and more particularly to novel substituted synthetic linear polymers and their preparation.

Primary objects of the present invention are the provision and preparation of novel compositions of matter comprising substituted synthetic linear polymers which are characterized by recurring functional groups selected from the class consisting of amide, sulfonamide, carbamide and urethane groups containing functional nitrogen atoms a proportion of which are substituted with polymeric ethylene oxide substituents.

Other objects of the invention will in part be obvious and will in part appear hereinafter.

The invention accordingly comprises the several steps and the relation and order of one or more of such steps with respect to each of the others, and the composition of matter possessing the features and properties which are exemplified in the following detailed disclosure, and the scope of the application of which will be indicated in the claims.

For a fuller understanding of the nature and objects of the invention, reference should be had to the following detailed description.

The substituted synthetic linear polymers contemplated by the present invention are:

the N-polyethylene oxide polyamides containing recurring substituted functional groups represented by the general formula:

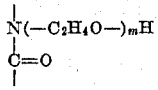

the N-polyethylene oxide polysulfonamides containing recurring substituted functional groups represented by the general formula:

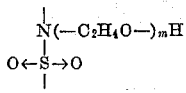

the N-polyethylene oxide polycarbamides containing recurring substituted functional groups represented by the general formula:

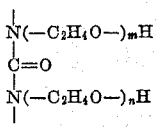

the N-polyethylene oxide polyurethanes containing recurring substituted functional groups represented by the general formula:

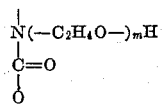

and interpolymers containing recurring substituted functional groups of the foregoing types; wherein the average value of $m$ is at least 2 and the average value of $n$ is at least 0.

The physical properties of a substituted synthetic linear polymer of the foregoing type are determined in large measure by the proportion of its functional nitrogen atoms which are substituted with polymeric ethylene oxide substituents and by the average number of combined ethylene oxide residues contained in each substituent. Substituted synthetic linear polymers of the present invention, depending on their degree and character of substitution, may be widely employed, for example, in the manufacture of fibres, fabrics, films, fabric-supported films, molded articles, lacquers, coatings, dispersing agents, plasticizers, thickeners, tackifiers, adhesives, etc.

Greatly preferred for use in the manufacture of self-supported structures such as fibres, fabrics, films, including fabric-backed films, molded articles, etc. are substituted synthetic polymers of the foregoing type of which from 5 to 60 percent of the functional nitrogen atoms are substituted with polymeric ethylene oxide substituents, each of which contains on the average from 2 to 18 combined ethylene oxide residues. Such polymers contain from 5 to 55 percent combined polyethylene oxide by total weight. Such polymers are composed of so-called "feather" molecules, the unsubstituted functional groups of which, by virtue of their being hydrogen-bonded together, impart high wet strength to the polymer, and the substituted portions of which, by virtue of their amorphous hydrophilic character, impart great flexibility and high moisture permeability to the polymer.

Synthetic linear polymers of the foregoing type which contain from 70 to 95 percent combined polyethylene oxide by total weight are gumlike or waxlike materials extremely useful in the manufacture of dispersing agents, plasticizers, thickeners, tackifiers, adhesives, etc.

As examples of the wide variety of synthetic linear polymers from which the substituted synthetic linear polymers of the present invention may be prepared, mention may be made of: polyamides prepared, for example, by heating amino acid esters under low pressure as described in U. S. Patent 2,071,253, by reacting diamines and dicarboxylic acid diesters as described in U. S. Patent 2,130,523, by reacting dibasic acids and diamines as described in U. S. Patents 2,130,947 and 2,130,948, by heating lactams in the presence of suitable promoters as described in U. S. Patent 2,241,321, by heating nitriles and diamines in the presence of water, and by heating aminonitriles in the presence of water as described in U. S. Patent 2,205,129; polycarbamides prepared, for example, by reacting diurethanes and diamines as described in U. S. Patent 2,181,663, and by reacting diisocyanates and diamines as described in U. S. Patent 2,292,443; polyurethanes prepared, for example, by reacting diisocyanates and diols as described in U. S. Patent 2,284,637; interpolymers prepared, for example, by reacting diamines and dicarboxylic acids which contain sulfonamide groups as described in U. S. Patent 2,223,916, and by interpolymerizing several amide-forming reagents as described in U. S. Patent 2,285,009; polymers, the carbon chains of which are interrupted by hetero atoms, prepared, for example, by reacting diacids and diamines which contain tertiary nitrogen atoms as described in U. S. Patent 2,274,831, by reacting diamines which contain ether oxygen and diacids as described in U. S. Patent 2,359,867, and by reacting diacids which contain ether oxygen and diamines which contain ether oxygen as described in U. S. Patent 2,158,064; mixed polyester polyamides prepared, for example, by reacting amino alcohols, dibasic acids and diamines, by reacting amino alcohols, dibasic acids and amino acids, and by reacting amino alcohols, dibasic acids and hydroxy acids as described in U. S. Patent 2,396,248; and partially substituted linear polyamides such as linear polyamides having the hydrogen atoms of a portion of the amide groups replaced by alkyl groups, prepared, for example, as described in the above-mentioned U. S. Patents 2,071,253 and 2,130,948, or replaced by alkoxymethyl groups, for example, by reacting polyamides, formaldehyde and methanol as described in U. S. Patent 2,412,993.

One method of preparing substituted synthetic linear polymers in accordance with the present invention is to react a synthetic linear polymer of the type described above with liquid ethylene oxide at elevated temperature in a pressure vessel. The liquid ethylene oxide preferably is in excess of that which is to participate in the reaction and in sufficient quantity to thoroughly wet the polymer. Although the reaction conditions may be varied within wide limits, preferably, the reaction temperature ranges from 60° to 110° C. and the reaction duration ranges from 2 to 60 hours. The reaction is such that polyethylene oxide substituents grow from only a proportion of the functional nitrogen atoms. This phenomenon apparently is caused by the relatively high reactivity of the generated hydroxyl groups in comparison with the relatively low reactivity of the unsubstituted functional groups. The number and length of polyethylene oxide substituents can be controlled by limiting the reaction temperature and the reaction duration and by varying the physical character of the starting polymer.

Another way of controlling the number and length of polyethylene oxide substituents is to limit the quantity of ethylene oxide present during the reaction. In some cases, where small quantities of ethylene oxide are employed, in order to wet the polymer thoroughly, and, thereby, to assure a substituted polymer having uniform physical properties, the ethylene oxide is diluted with a solvent, such as dioxane, benzene, toluene, hexane, carbon tetrachloride, diethyl ether, chloroform and ligroin, which is inert to ethylene oxide.

The reaction may be catalyzed by a base, such as an alkali-metal hydroxide or a tertiary amine. For example, immediately before the reaction is initiated, the polymer, in powdered form, may be steeped in the base and thereafter drained.

Another method of preparing substituted synthetic linear polymers, in accordance with the present invention, is to react a synthetic linear polymer of the type described above with ethylene carbonate in the presence of an alkaline catalyst. The synthetic linear polymers which are adapted to be treated in this manner are those which dissolve in ethylene carbonate at elevated temperatures. Although the reaction conditions may be varied within wide limits, preferably the reaction temperature ranges from 50° to 250° C. and the reaction duration ranges from 1 to 20 hours.

It is further possible to conduct reactions of the foregoing type in solution. Here the solvent preferably is one which does not contain active hydrogen atoms and which therefore is inert to ethylene oxide. By way of example, an interpolymer of caprolactam, hexamethylene adipamide and hexamethylene sebacamide may be reacted with ethylene oxide at elevated temperature in dimethyl formamide.

The invention is further illustrated by the following non-limiting examples:

*Example 1*

100 grams of pellets of an interpolymer of caprolactam, hexamethylene adipamide and hexamethylene sebacamide (sold by Du Pont under the trade name nylon FM6501) were reacted with excess ethylene oxide at 78° to 81° C. for 15.5 hours in a one liter stainless steel bomb. The reaction product, swollen brown pellets, was washed and dried. The isolated substituted polymer was analyzed with the following result:

Combined ethylene oxide content by total weight analysis _____percent__ 24.4
Combined ethylene oxide content by nitrogen analysis _____percent__ 25.7
Fraction of combined ethylene oxide separated from nitrogen atoms by single ethylene oxide residues _____percent__ 56.0
Fraction of functional nitrogen atoms substituted with polyethylene oxide substituents__percent__ 39.5
Average number of combined ethylene oxide residues per substituent_____ 2.25

*Example 2*

100 grams of pellets of an interpolymer of caprolactam, hexamethylene adipamide and hexamethylene sebacamide (sold by Du Pont under the trade name nylon FM6501) were reacted with excess ethylene oxide at 78° to 81° C. for 18 hours in a one liter stainless steel bomb. The reaction product, swollen brown pellets, after being washed and dried, weighed 153.9 grams. The isolated substituted polymer was analyzed with the following result:

Combined ethylene oxide content by total weight analysis _____percent__ 25.0
Combined ethylene oxide content by nitrogen analysis _____percent__ 35.5
Fraction of combined ethylene oxide separated from nitrogen atoms by single ethylene oxide residues _____percent__ 80.0
Fraction of functional nitrogen atoms substituted with polyethylene oxide substituents__percent__ 28.2
Average number of combined ethylene oxide residues per substituent_____ 4.99

A film was prepared by casting on glass a 15% solution, by total weight, of the substituted polymer in ethyl alcohol (95%). This film, 5.5 mils thick, had a moisture permeability of 34.5 grams of water per square meter per hour. By comparison, a film of the unsubstituted polymer, 5.5 mils thick, had a moisture permeability of 5.67 grams per square meter per hour.

*Example 3*

150 grams of pellets of an interpolymer of caprolactam, hexamethylene adipamide and hexamethylene sebacamide (sold by Du Pont under the trade name nylon FM6501) were reacted with excess ethylene oxide at 88° to 91° C. for 16 hours in a one liter stainless steel bomb. The reaction product, a gel, was soluble in water, dioxane and methanol. This gel was analyzed with the following result:

Combined ethylene oxide content by nitrogen analysis _____percent__ 73.6
Fraction of combined ethylene oxide separated from nitrogen atoms by single ethylene oxide residues _____percent__ 90.0
Fraction of functional nitrogen atoms substituted with polyethylene oxide substituents__percent__ 73.0
Average number of combined ethylene oxide residues per substituent_____ 9.83

*Example 4*

50 grams of pellets of polyhexamethylene adipamide were reacted with 260 milliliters of ethylene oxide at 78° to 81° C. for 16 hours in a one liter stainless steel bomb. The reaction product, swollen brown pellets, after being washed and dried, weighed 128.8 grams. The isolated substituted polymer was found to be soluble in such solvents as formic acid, glacial acetic acid, ethylene chlorohydrin and metacresol. The isolated substituted polymer was analyzed with the following result:

Combined ethylene oxide content by total weight analysis _____percent__ 48.5
Combined ethylene oxide content by nitrogen analysis _____percent__ 49.5
Fraction of combined ethylene oxide separated from nitrogen atoms by single ethylene oxide residues _____percent__ 85.0
Fraction of functional nitrogen atoms substituted with polyethylene oxide substituents__percent__ 37.4
Average number of combined ethylene oxide residues per substituent _____ 6.72

A film was prepared by casting on glass a 15% solution, by total weight, of the substituted polymer in formic acid (87%). The film, 2.9 mils thick, had a moisture permeability of 41.8 grams of water per square meter per hour. A similar film, 2.2 mils thick, had a moisture permeability of 52.8 grams of water per square meter per hour. These films were flexible, strong and tough. In comparison, a film of the unsubstituted polymer, 6.8 mils thick, had a moisture permeability of 3.13 grams of water per square meter per hour.

*Example 5*

50 grams of pellets of polyhexamethylene adipamide were reacted with 216 milliliters of ethylene oxide at 78° to 81° C. for 7 hours in a one liter stainless steel bomb. The reaction product was washed thoroughly with water and dried under vacuum over concentrated sulfuric acid. The isolated substituted polymer was analyzed with the following result:

Combined ethylene oxide content by total weight analysis _____percent__ 7.9
Combined ethylene oxide content by nitrogen analysis _____percent__ 7.5
Fraction of combined ethylene oxide separated from nitrogen atoms by single ethylene oxide residues _____percent__ 68.0
Fraction of functional nitrogen atoms substituted with polyethylene oxide substituents__percent__ 6.7
Average number of combined ethylene oxide residues per substituent_____ 3.08

*Example 6*

50 grams of polycaprolactam were reacted with excess ethylene oxide at 78° to 81° C. for 20.5 hours in a one liter stainless steel bomb. The reaction product, yellow pellets swollen to several times their original size, was washed thoroughly with water and dried under vacuum over concentrated sulfuric acid. The isolated substituted polymer was analyzed with the following result:

Combined ethylene oxide content by nitrogen analysis _____percent__ 56.2
Fraction of combined ethylene oxide separated from nitrogen atoms by single ethylene oxide residues _____percent__ 83.0
Fraction of functional nitrogen atoms substituted with polyethylene oxide substituents__percent__ 57.0
Average number of combined ethylene oxide residues per substituent_____ 5.73

The substituted polymer, which swelled but was insoluble in such solvents as formic acid, glacial acetic acid, ethylene chlorohydrin and metacresol, appeared to be cross linked. However, the substituted polymer was dissolved, as well as partially hydrolyzed, by prolonged heating in formic acid (87%) at 60° C. A film cast on glass from this solution, 5.5 mils thick, had a moisture permeability of 39.5 grams of water per square meter per hour.

*Example 7*

10 grams of an interpolymer of hexamethylene adipamide and hexamethylene diglycolamide were prepared by condensing .144 mole of dimethyl adipate, .104 mole of dimethyl diglycolate and .24 mole of hexamethylene diamine. The interpolymer was reacted with excess ethylene oxide at 78° to 81° C. for 16 hours in a one liter stainless steel bomb. The reaction product was purified by reprecipitation from methanol into acetone and dried. Nitrogen analysis indicated that the substituted polymer contained 10% combined ethylene oxide by weight.

*Example 8*

50 grams of N-methoxy methylated polyhexamethylene adipamide (sold by Du Pont under the trade name nylon type 8, DV45), by analysis, containing by weight, 10.9% of methoxy methyl groups and 2.3% of N-methylol groups were reacted with excess ethylene oxide at 80° C. for 16.5 hours in a one liter stainless steel bomb. The reaction product, a white granular powder, was washed with water and dried under vacuum over concentrated sulfuric acid. The isolated substituted polymer was insoluble in water and dioxane and soluble in ethanol, ethanol-water mixtures and methyl Cellosolve-water mixtures. The isolated substituted polymer was analyzed and found to contain by weight 9.86% of methoxy methyl groups, 2.09% of N-methylol groups and 9.5% combined ethylene oxide. Analysis also indicated that 63% of the combined ethylene oxide was separated from the functional nitrogen atoms by N-methylol groups or by single ethylene oxide residues.

A film was prepared by casting on glass a 15% solution, by total weight, of the substituted polymer in ethanol (95%). This film, 3.7 mils thick, had a moisture permeability of 21.9 grams of water per square meter per hour, was flexible and strong, and did not swell excessively in water. In comparison, a film of the unsubstituted polymer, 3.6 mils thick, had a moisture permeability of 13.0 grams per square meter per hour.

*Example 9*

100 grams of N-methoxy methylated polyhexamethylene adipamide (sold by Du Pont under the trade name nylon type 8, DV45) were reacted with a solution of 150 milliliters of dioxane and 16 grams of ethylene oxide at 80° C. for 23 hours and at 90° C. for 48 hours. The reaction product, a yellow powdery solid, was extracted with acetone and dried. Nitrogen analysis indicated that the substituted polymer contained 10% combined ethylene oxide by weight.

*Example 10*

50 grams of N-methoxy methylated polyhexamethylene adipamide (sold under the trade name nylon type 8, DV45) were steeped in excess aqueous sodium hydroxide (10%) for one hour. After the resulting slurry was filtered, the moist polymer was reacted with excess ethylene oxide at 78° to 81° C. for 16 hours in a one liter stainless steel bomb. Nitrogen analysis indicated that the substituted polymer contained 5.6% combined ethylene oxide by weight.

*Example 11*

4 grams of a powder of a polyamide sulfonamide, prepared from hexamethylene disulfonyl bis-ϵ-amino caproic acid and hexamethylene diamine, were reacted with excess ethylene oxide at 78° to 81° C. for 40 hours in a one liter stainless steel bomb. The reaction product, swollen powder, was washed thoroughly with water and dried. The isolated substituted polymer swelled in such solvents as water, ethanol and formic acid. Comparison of the sulfur content of the unsubstituted polymer with the sulfur content of the substituted polymer indicated that the substituted polymer contained 26% combined ethylene oxide by weight.

Example 12

20 grams of a polycarbamide, prepared from tolylene diisocyanate and hexamethylene diamine, were reacted with a solution of 50 milliliters of purified dioxane and 15 grams of ethylene oxide at 78° to 81° C. for 21 hours in a one liter stainless steel bomb. The reaction product was diluted with water and the substituted polymer was isolated by filtering, washing and drying at 50° C. Nitrogen analysis indicated that the substituted polymer contained 23% combined ethylene oxide by weight.

Example 13

17.4 grams of tolylene diisocyanate and 15 grams of triethylene glycol were reacted in an atmosphere of dry nitrogen at 100° C. for 12 hours. The resulting polyurethane, a hard glassy cake, was powdered. 10 grams of the powdered polyurethane were reacted with excess ethylene oxide at 78° to 81° C. for 20 hours in a one liter stainless steel bomb. Thereafter, the remaining excess ethylene oxide was allowed to evaporate and the resulting powder was washed with acetone and dried. A comparison of the weight of the unsubstituted polymer with the weight of substituted polymer indicated that ethylene oxide substitution had taken place.

Example 14

20 grams of an interpolymer of caprolactam, hexamethylene adipamide and hexamethylene sebacamide (sold by Du Pont under the trade name nylon FM6501) were reacted with 100 grams of ethylene carbonate in the presence of 1 gram of potassium carbonate at 170° to 180° C. for 6 hours. The substituted polymer was precipitated by cooling the reaction mixture and diluting it with water. The substituted polymer was washed, reprecipitated from ethanol into water and dried. Nitrogen analysis indicated that the substituted polymer contained 24.9% of substituents by weight.

A film was prepared by casting on glass a 15% solution, by total weight, of the polymer in alcohol/water (80%/20%). The film, 4 mils thick, had a moisture permeability of 17.8 grams of water per square meter per hour and was flexible, strong and tough.

In the foregoing examples, the weight of the combined ethylene oxide in the substituted polymer was determined by comparing the overall weights of the substituted and the unsubstituted polymer and/or by comparing the nitrogen contents by weight of the substituted and the unsubstituted polymer. It has been found that reacting the substituted polymer with hydrogen iodide in accordance with the method of Morgan (Industrial Engineering Chemistry, Analytical Edition, vol. 18, page 500, 1946), provides an indication of the percentage of combined ethylene oxide residues spaced from the functional nitrogen atoms with which they are associated by single ethylene oxide residues. By means of the foregoing data, it is possible to calculate the number of functional nitrogen atoms joined by polyethylene oxide substituents and the average number of combined ethylene oxide residues per substituent.

It will be understood that one may describe the novel products of this invention as "N-polyoxyethylene substituted" instead of "N-polyethylene oxide substituted." By "ethylene oxide residue" is meant the oxyethylene unit —C₂H₄O—.

Since certain changes may be made in the above composition of matter and process without departing from the scope of the invention herein involved, it is intended that all matter contained in the above description shall be interpreted as illustrative and not in a limiting sense.

What is claimed is:

1. A self-supported structure composed of a solid, water-insoluble, N-polyoxyethylene substituted synthetic linear polymer comprising recurring functional groups containing functional nitrogen atoms and being selected from the class consisting of

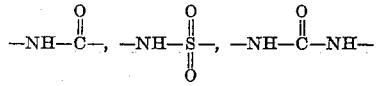

and

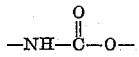

groups, wherein the hydrogen atoms of from 5 to 60% of said functional groups are replaced by polyoxyethylene branches, and when said polymer comprises

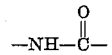

functional groups, the hydrogen atoms of a portion of the remaining

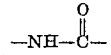

groups may be replaced by members of the group consisting of alkyl and alkoxymethyl groups, said polyoxyethylene branches containing an average of from 2 to 18 —C₂H₄O— groups, said functional groups being joined together by divalent groups selected from the class consisting of divalent hydrocarbon groups and divalent hydrocarbon groups containing hetero atoms, said polymer containing about 5 to 55% combined oxyethylene by weight.

2. A self-supported structure as defined in claim 1 wherein said structure is a film.

3. A self-supported structure composed of a solid, water-insoluble, N-polyoxyethylene substituted synthetic linear polymer which is composed of recurring

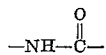

functional groups containing functional nitrogen atoms, said groups being joined together by divalent hydrocarbon groups, wherein from 5 to 60% of the hydrogen atoms of said functional groups are replaced by polyoxyethylene branches, said polyoxyethylene branches containing an average of from 2 to 18 —C₂H₄O— groups, said polymer containing about 5 to 55% combined oxyethylene by weight.

4. A self-supported structure composed of a solid, water-insoluble, N-polyoxyethylene substituted polymer comprising a polyhexamethylene adipamide wherein from 5 to 60% of the functional nitrogen atoms thereof are substituted with polyoxyethylene branches, said polyoxyethylene branches containing an average of from 2 to 18 —C₂H₄O— groups, said polymer containing about 5 to 55% combined oxyethylene by weight.

5. A self-supported structure composed of a solid, water-insoluble, N-polyoxyethylene substituted polymer comprising an interpolymer of caprolactam, hexamethylene adipamide and hexamethylene sebacamide, wherein from 5 to 60% of the functional nitrogen atoms thereof are substituted with polyoxyethylene branches, said polyoxyethylene branches containing an average of from 2 to 18 —C₂H₄O— groups, said polymer containing about 5 to 55% combined oxyethylene by weight.

6. A self-supported structure composed of a solid, water-insoluble, N-polyoxyethylene substituted polymer comprising a polycaprolactam, wherein from 5 to 60% of the functional nitrogen atoms thereof are substituted with polyoxyethylene branches, said polyoxyethylene branches containing an average of from 2 to 18 —C₂H₄O— groups, said polymer containing about 5 to 55% combined oxyethylene by weight.

7. A self-supported structure composed of a solid, water-insoluble, N-polyoxyethylene substituted polymer comprising a N-methoxy methylated polyhexamethylene adipamide, wherein from 5 to 60% of the functional nitrogen atoms thereof are substituted with polyoxyethylene branches, said polyoxyethylene branches containing an average of from 2 to 18 —$C_2H_4O$— groups, said polymer containing about 5 to 55% combined oxyethylene by weight.

References Cited in the file of this patent

UNITED STATES PATENTS

| | | |
|---|---|---|
| 2,289,775 | Graves | July 14, 1942 |
| 2,448,767 | Carlson | Sept. 7, 1948 |
| 2,456,271 | Graham | Dec. 14, 1948 |
| 2,465,109 | McQueen et al. | Mar. 22, 1949 |
| 2,574,544 | De Groote | Nov. 13, 1951 |
| 2,652,388 | De Groote | Sept. 15, 1953 |

OTHER REFERENCES

Hopff et al.: A. P. C. Serial No. 393,282, published April 20, 1943.

Cairn: Journal of the American Chemical Society, vol. 71, pages 655–657. (Copy in Scientific Library.)

Hagedorn: A. P. C. Serial No. 393,282, published April 20, 1943.

UNITED STATES PATENT OFFICE
CERTIFICATE OF CORRECTION

Patent No. 2,835,653    May 20, 1958

Howard C. Haas et al.

It is hereby certified that error appears in the printed specification of the above numbered patent requiring correction and that the said Letters Patent should read as corrected below.

Column 4, line 28, for "percent -- 25.0" read -- percent -- 35.0 --; column 10, list of references cited, under "OTHER REFERENCES", next to the last line, for "Serial No. 393,282" read -- Serial No. 323,512 --.

Signed and sealed this 10th day of March 1959.

(SEAL)
Attest:
KARL H. AXLINE
Attesting Officer

ROBERT C. WATSON
Commissioner of Patents